No. 788,584. PATENTED MAY 2, 1905.
C. B. JACOBS.
PROCESS OF REDUCING METALS FROM THEIR SOLUTIONS.
APPLICATION FILED JUNE 8, 1900. RENEWED SEPT. 16, 1904.
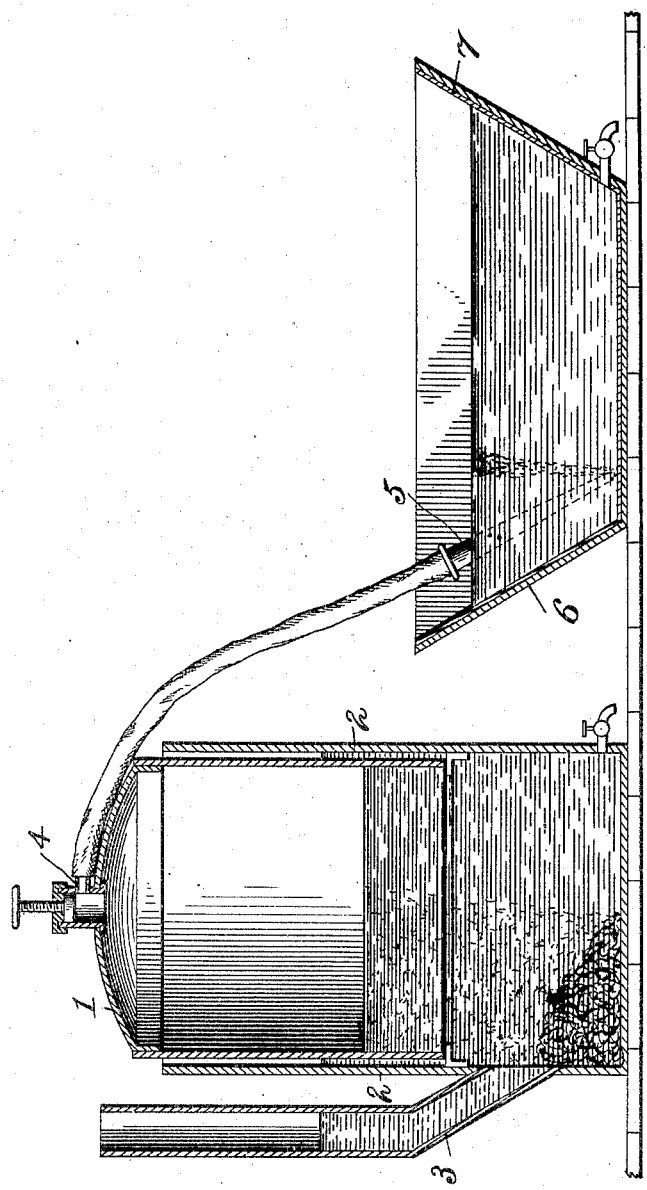

No. 788,584. Patented May 2, 1905.

UNITED STATES PATENT OFFICE.

CHARLES B. JACOBS, OF EAST ORANGE, NEW JERSEY, ASSIGNOR TO THE AMPERE ELECTRO-CHEMICAL COMPANY, OF PORT CHESTER, NEW YORK, A CORPORATION OF NEW YORK.

PROCESS OF REDUCING METALS FROM THEIR SOLUTIONS.

SPECIFICATION forming part of Letters Patent No. 788,584, dated May 2, 1905.

Application filed June 8, 1900. Renewed September 16, 1904. Serial No. 224,682.

*To all whom it may concern:*

Be it known that I, CHARLES B. JACOBS, a citizen of the United States, and a resident of East Orange, county of Essex, State of New Jersey, have invented certain new and useful Improvements in Processes of Reducing Metals from Their Solutions, of which the following is a specification.

This invention relates to the reduction of gold from its solutions, and more especially to the reduction of gold from its cyanid and chlorid solutions by means of a novel treatment with phosphide of hydrogen.

The invention depends for its controlling principle upon the powerful action of gaseous phosphide of hydrogen on acid solutions of chlorid of gold and on solutions of aurocyanic acid.

This invention is an improvement on the process of reducing metals from their solutions granted me in United States Letters Patent No. 624,040, in which process I operated with phosphide of hydrogen on solutions of gold and silver (together with the various base metals that may occur associated in the ores of gold and silver) in which an alkali or an alkaline material was present, precipitating the gold and silver in a metallic state and the base metals as phosphides, in which form the gold and silver may be readily separated from the base-metal phosphides by means of suitable fluxes in the ordinary way of obtaining bullion. I have now discovered that if the solutions containing the noble metals together with base metals be made acid before the treatment with phosphide of hydrogen the base metals are entirely unaffected and that only the noble metal is acted upon by phosphide of hydrogen. I prefer to use muriatic acid to make the solutions acid. In case the silver is present with the gold the silver is at once precipitated as silver chlorid and is filtered off and reduced separately from the gold by the ordinary means of reducing silver chlorid. The acid solution containing the gold and base metals is then subjected to the action of phosphide of hydrogen, which brings the gold down as a precipitate and leaves the base metals unaffected and remaining in solution. With chlorid-of-gold solutions the reaction is as follows:

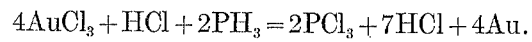
$$4AuCl_3 + HCl + 2PH_3 = 2PCl_3 + 7HCl + 4Au.$$

Metallic gold is precipitated, and the base metals when present remain in solution, as the presence of the free hydrochloric acid prevents their precipitation as phosphides, in which form they are precipitated in neutral or alkaline solutions.

In dealing with cyanid solutions of gold, for which the process is especially designed, two sets of reactions take place, the first of which is as follows:

$$KAu(Cn_2) + HCl = HAu(Cn_2) + KCl,$$

the result of which is the formation of aurocyanic acid, $HAu(Cn_2)$. When aurocyanic acid is subjected to the action of gaseous phosphide of hydrogen, the following reaction takes place:

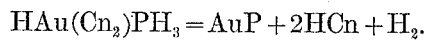
$$HAu(Cn_2)PH_3 = AuP + 2HCn + H_2.$$

A phosphide of gold is precipitated, which methods of exact analysis have shown to have the formula $AuP4H_2O$. All base metals which were present remain in solution.

The hydrocyanic acid formed by the above reaction and also that which is produced by the action of the hydrochloric acid on the excess of potassium cyanid, which is always present in cyanid mill solutions, is converted by treatment with caustic-potash solutions into potassium cyanid for use in the treatment of fresh ores. The precipitate consisting of metallic gold in the case of chlorid solutions and of phosphide of gold in the case of cyanid solutions is heated at a low heat to drive off phosphorus and anneal the gold, so that it may be handled without mechanical loss. The gaseous precipitant is produced by putting calcium phosphide into water and collecting the phosphide of hydrogen thereby produced in a gas-holder, from which it is led and distributed throughout the solution by any suitable apparatus.

My invention therefore comprises a method of precipitating the noble metals from solutions containing them in the presence of base metals by treating such solutions, and particularly cyanid solutions, with phosphide of hydrogen after the solutions have been made acid, preferably with hydrochloric acid.

The accompanying drawing illustrates an apparatus for carrying out my method. It comprises a telescope gas-holder formed of galvanized iron or steel in two sections 1 and 2, arranged to telescope together, brackets being mounted upon the inside of the stationary portion 2 to form a support for the movable portion 1 when it reaches its lowest position. From the stationary member of the tank at a point near the bottom extends a spout 3, and from the top of the movable member leads a pipe 4, controlled by a stop-cock, from which gas may be led through a flexible pipe to a distributing-tube 5, from which the gas may be distributed through the solution contained in a tank 6. The tank is lined with a flexible material, such as canvas, (indicated at 7.) Phosphide of calcium may be introduced into the gas-holder through the spout 3 and will be slowly decomposed by the water into calcium hydrate and hydrogen phosphide, which collects in the space above the tank and gradually displaces the water with which the tank is filled at the commencement of the operation. In tank 6 is placed the mill solution containing silver or gold, or both together, with the base metals after it has been made acid with hydrochloric acid in a tank of exactly similar construction. In case of silver being present it is precipitated and removed from the solution as silver chlorid. Base metals—such as copper, antimony, zinc, iron, &c.—which may be present in the same solution are not affected by the presence of free hydrochloric acid by phosphide of hydrogen, while the gold is quickly and completely precipitated. I prefer to line the tank with cloth or canvas of fine mesh to trap the precipitate and allow the solution to drain off. During the operation sample tests should be made from time to time, and when all of the gold has been thrown down the gas should be turned off and the canvas removed from the tank. The precipitate is then washed and removed to a clay crucible and dried, first by a slow heat and then the temperature raised to an annealing heat to cement the particles of gold together.

As an example of the practical operation of the process a cyanid mill solution corresponding to one ounce of gold per ton of solution was used in which ten ounces of copper and iron had been dissolved. .989 ounce of fine gold was recovered, in which no trace of iron or copper could be found. The consumption of raw materials was as follows: 6.24 pounds of calcium phosphide per ton of solution and .75 pound of hydrochloric acid per ton of solution. 1.5 pounds of caustic potash was used in the regeneration of potassium cyanid. Fifty per cent. of the original potassium cyanid was recovered. An extremely dilute solution was then made on the basis of one ounce of gold to twenty-five tons of solution. In practice mill solutions do not often run below one ounce of gold to six or seven tons of solution. 96.5 per cent. of the gold was recovered in a pure state. The consumption of the phosphide was proportionately the same as in the first example cited.

The advantage of my process as applied to cyanid solutions in particular over the zinc method of precipitation and over the phosphide method in alkaline or neutral solutions are: the entire absence of base metals in the precipitates obtained and the extreme purity of the resulting bullion; the elimination of loss in values due to necessary smelting processes when base metals exist with the precious metals; the avoidance of the difficulty of handling the great bulk of raw material in the zinc-boxes without loss; the application of the cyanid treatment to ores, which under the zinc method are not applicable to that method owing to the presence of certain base metals. The unavoidable disadvantages of the zinc method, such as the selective action in the zinc-boxes and use of weak-solution boxes, are entirely eliminated by the phosphide method. Broadly, the phosphide method of precipitation overcomes the many disadvantages of the zinc process and at the same time renders the precipitation cheaper, operates more rapidly, produces a fine bullion, and broadens the application of the cyanid treatment.

Having thus described my invention and set forth its advantages, what I claim as new, and desire to secure by Letters Patent, is—

1. The process of separating gold, from base metals, in cyanid solutions containing gold and base metal, consisting in subjecting the solution to the action of gaseous phosphide of hydrogen, in the presence of free acid, thereby precipitating the gold while retaining the base metal in solution.

2. The process of separating gold from base metals in cyanid solutions, consisting in acidifying the solution containing gold and base metal with hydrochloric acid and subjecting said solution to the action of gaseous phosphide of hydrogen.

3. The process of precipitating gold from its cyanid solutions, consisting in acidifying the solution containing gold and base metal with hydrochloric acid, thereby forming aurocyanic acid and then subjecting the solution to the action of gaseous phosphide of hydrogen.

4. The process of separating gold from base metals, in solutions, consisting in acidifying the solution containing gold and base metal with hydrochloric acid and subjecting the solution to the action of gaseous phosphide of hydrogen.

5. The process of separating gold from base metals in cyanid solutions consisting in acidifying with hydrochloric acid and subjecting the solution to the action of gaseous phosphide of hydrogen, thereby precipitating the phosphide of gold, while the base metals remain in solution, and heating the phosphide of gold to eliminate the phosphorus.

CHARLES B. JACOBS.

Witnesses:
   HARRY E. KNIGHT,
   J. GREEN.